(12) United States Patent
Miyazaki et al.

(10) Patent No.: US 11,372,013 B2
(45) Date of Patent: Jun. 28, 2022

(54) APPARATUS EQUIPPED WITH SAMPLE TEMPERATURE CONTROL FUNCTION

(71) Applicant: Shimadzu Corporation, Kyoto (JP)

(72) Inventors: Koki Miyazaki, Kyoto (JP); Shinji Tanaka, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 603 days.

(21) Appl. No.: 16/408,279

(22) Filed: May 9, 2019

(65) Prior Publication Data

US 2019/0383845 A1    Dec. 19, 2019

(30) Foreign Application Priority Data

Jun. 18, 2018  (JP) .............................. JP2018-115217

(51) Int. Cl.
*G01N 35/04* (2006.01)
*G01N 30/88* (2006.01)
G01N 30/02 (2006.01)
G01N 35/00 (2006.01)

(52) U.S. Cl.
CPC ............ *G01N 35/04* (2013.01); *G01N 30/88* (2013.01); *G01N 2030/027* (2013.01); *G01N 2030/8804* (2013.01); *G01N 2035/00445* (2013.01); *G01N 2035/00455* (2013.01); *G01N 2035/0413* (2013.01)

(58) Field of Classification Search
None
See application file for complete search history.

(56) References Cited

U.S. PATENT DOCUMENTS 5,934,368 A * 8/1999 Tanaka ................... H05K 7/207
236/44 R
2012/0285872 A1   11/2012 Shreve et al.
(Continued)

FOREIGN PATENT DOCUMENTS

CN         106133499 A      11/2016
JP         2004212165 A  *   7/2004
(Continued)

OTHER PUBLICATIONS

Notice of Reasons for Rejection from the Japanese Patent Office dispatched on Oct. 5, 2021, for corresponding Japanese Patent Application No. 2018-115217.
(Continued)

*Primary Examiner* — Kathryn Wright
(74) *Attorney, Agent, or Firm* — Muir Patent Law, PLLC

(57) ABSTRACT

To suppress generation of dew condensation in temperature control space when heating temperature control is performed. In an apparatus, an air temperature control part for cooling or heating air in temperature control space has a first temperature control element for performing at least cooling of air, and a second temperature control element for performing at least heating of air downstream of the first temperature control element. In this manner, when heating temperature control is performed, cooling and dehumidification of air taken in from an air intake portion can be performed by the first temperature control element, and then heating of the dehumidified air can be performed by the second temperature control element.

3 Claims, 4 Drawing Sheets

(56) References Cited

U.S. PATENT DOCUMENTS

| 2014/0250938 | A1* | 9/2014 | Tanaka | F25B 21/02 |
| | | | | 62/303 |
| 2015/0346069 | A1* | 12/2015 | Inoue | G01N 30/16 |
| | | | | 73/863.11 |
| 2016/0274011 | A1 | 9/2016 | Maeda | |

FOREIGN PATENT DOCUMENTS

| JP | 2016-176749 A | 10/2016 |
| WO | 2013/190747 A1 | 12/2013 |

OTHER PUBLICATIONS

First Office Action from the Chinese Patent Intellectual Property for corresponding application No. CN 201910320018.2 dated May 28, 2021, submitted with a machine translation.
Extended European Search Report, dated Nov. 28, 2019, for the counterpart European Patent Application 19175321.9.

* cited by examiner

APPARATUS EQUIPPED WITH SAMPLE TEMPERATURE CONTROL FUNCTION

BACKGROUND OF THE INVENTION

1. Field of the Invention

The present invention relates to an apparatus having a sample temperature control function, which is used in an analysis device, such as a liquid chromatograph, that controls a temperature while cooling or heating a sample.

2. Description of the Related Art

Some liquid chromatograph autosamplers have a function of cooling a sample plate containing a sample to be analyzed and adjusting the temperature to a constant temperature in order to prevent alteration or the like of the sample (for example, see JP-A-2016-176749).

Temperature control systems of s sample include a direct temperature control system in which a sample plate holding a sample is disposed on a metal plate on which a temperature control element, such as a Peltier element, is attached and a container is directly cooled or heated (see JP-A-2016-176749), and an air temperature control system in which a sample plate is disposed in a space (hereinafter referred to as temperature control space) thermally separated from external air, and air in the temperature control space is cooled or heated by a temperature control element.

While the direct temperature control system has an advantage that a response speed of temperature control is satisfactory since the sample plate is directly cooled or heated, there is also a problem that it is difficult to uniformly cool or heat the sample plate since the sample plate is locally cooled or heated from a lower surface side of the sample plate. While the air temperature control system is inferior to the direct temperature control system in a response speed of temperature control, there is an advantage that it is easy to cool or heat a sample plate uniformly in the air temperature control system as compared with the direct temperature control system since the temperature control space in which a sample plate is disposed is cooled or heated entirely.

An apparatus equipped with the temperature control function as described above can generally perform temperature control of both heating temperature control for controlling a temperature of a sample by heating and cooling temperature control for controlling a temperature of a sample by cooling. However, it has been found that there is a problem that dew condensation occurs in the temperature control space when switching is made from cooling temperature control to heating temperature control in the air temperature control system.

In the air temperature control system, dew condensation water adheres to a radiator attached to a temperature control element at the time of cooling temperature control. If switching is made to heating temperature control in the above state, the dew condensation water adhered to the radiator evaporates, and a dew point temperature of air in the temperature control space rises. Since a temperature of a component in the temperature control space rises later than a temperature of air, dew condensation occurs on a surface of the component in a case where a surface temperature of the component is lower than or equal to the dew point temperature of air. Condensation that occurs in the temperature control space causes serious failures, such as malfunction of a metal component due to rusting, and short-circuiting of an electronic component.

In view of the above, an object of the present invention is to suppress generation of the dew condensation in the temperature control space when heating temperature control is performed.

SUMMARY OF THE INVENTION

An apparatus according to the present invention includes temperature control space for containing a sample and controlling a temperature of the sample, and an air temperature control part having an air intake portion for sucking air in the temperature control space, a fan for blowing air taken in from the air intake portion toward the sample contained in the temperature control space, a first temperature control element provided for performing at least cooling of air taken in from the air intake portion on a path of the air, and a second temperature control element that is driven independently of the first temperature control element and provided to perform at least heating of air taken in from the air intake portion downstream of the first temperature control element on a path of the air.

That is, in the apparatus according to the present invention, the air temperature control part for cooling or heating air in temperature control space has a first temperature control element for performing at least cooling of air, and a second temperature control element for performing at least heating of air downstream of the first temperature control element. In this manner, when heating temperature control is performed, cooling and dehumidification of air taken in from an air intake portion can be performed by the first temperature control element, and then heating of the dehumidified air can be performed by the second temperature control element. Therefore, since dehumidification and heating of the air in the temperature control space can be performed simultaneously, a dew point temperature of air circulating in the temperature control space is lowered, and generation of dew condensation in the temperature control space is suppressed.

Dew condensation is likely generated during heating temperature control as described above in a case where switching from cooling temperature control to heating temperature control is made and the temperature of the air in the temperature control space is rapidly increased. In view of the above, in a preferred embodiment of the apparatus according to the present invention, a temperature control part configured to control operation of the air temperature control part to adjust a temperature in the temperature control space is configured to execute dehumidifying heating operation for cooling and dehumidifying air taken in from the air intake portion with the first temperature control element and heating air dehumidified by the first temperature control element with the second temperature control element in at least part of a process of raising a temperature in the temperature control space lower than room temperature. In this manner, when switching is made from the cooling temperature control to the heating temperature control, dehumidification of air by the first temperature control element and heating of air by the second temperature control element are performed simultaneously in at least part of a temperature increasing process of the heating temperature control, and generation of dew condensation in the temperature control space is suppressed.

If the temperature in the temperature control space exceeds the dew point temperature in the temperature increasing process of heating temperature control, dew condensation is not generated in the temperature control space. Therefore, the heating operation accompanied by the above dehumidification is unnecessary after the temperature in the temperature control space exceeds the dew point temperature. In view of the above, a further preferred embodiment of the apparatus according to the present invention further includes a temperature sensor configured to detect a temperature in the temperature control space. The temperature control part is configured to execute, in a process of raising a temperature in the temperature control space lower than room temperature, the dehumidifying heating operation until a temperature in the temperature control space detected by the temperature sensor reaches a threshold temperature that is a temperature equal to or higher than a dew point temperature, and stop cooling by the first temperature control element after the temperature in the temperature control space reaches the threshold temperature. In this manner, since the cooling by the first temperature control element is stopped after the temperature in the temperature control space exceeds the dew point temperature, heating efficiency of air can be improved.

The second temperature control element may be, for example, a Peltier element or the like, that can perform cooling of air. In such a case, the temperature control part is preferably configured to cool air taken in from the air intake portion with the first and second temperature control elements when performing cooling temperature control to lower a temperature in the temperature control space to a predetermined temperature lower than room temperature. In such a manner, air can be cooled by a plurality of temperature control elements, and the cooling temperature control in the temperature control space can be performed with high efficiency.

Similarly, the first temperature control element may be, for example, a Peltier element or the like, that can perform heating of air. In that case, the temperature control part is preferably configured to perform heating with the first and second temperature control elements when performing heating temperature control to raise a temperature in the temperature control space to a temperature higher than room temperature. In such a manner, air can be heated by a plurality of temperature control elements, and the heating temperature control in the temperature control space can be performed with high efficiency.

The present invention can be applied to an autosampler for a liquid chromatograph.

In the apparatus according to the present invention, the air temperature control part for cooling or heating air in temperature control space has a first temperature control element for performing at least cooling of air, and a second temperature control element for performing at least heating of air downstream of the first temperature control element. Accordingly, dehumidification and heating of air in the temperature control space can be performed simultaneously, and generation of dew condensation in the temperature control space can be suppressed.

DETAILED DESCRIPTION OF THE INVENTION

Hereinafter, an embodiment of an apparatus according to the present invention will be described with reference to the accompanying drawings.

Figure 1:
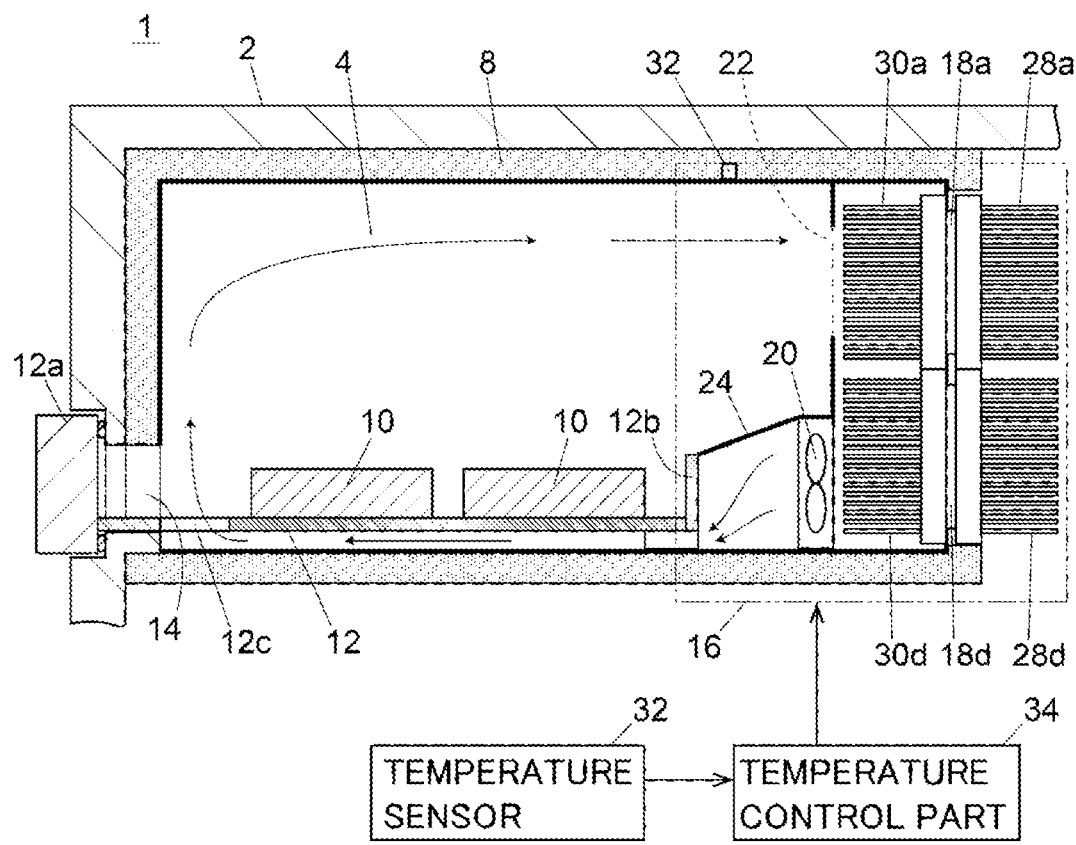
FIG. 1 is a schematic cross-sectional configuration diagram showing an embodiment of an apparatus having a sample temperature control function.

As shown in FIG. 1, an apparatus 1 includes a temperature control space 4 inside a housing 2. An outer peripheral surface of the temperature control space 4 is covered with a heat insulating layer 8 made from, for example, a polyethylene resin foam material or the like, except for a rear surface side (right side in FIG. 1) on which an air temperature control part 16 is provided.

A sample plate 10 holding a sample is placed on the bottom of the temperature control space 4 in a state of being mounted on the sample rack 12. Note that the sample plate 10 may hold a plurality of vials containing a sample, or may have a plurality of wells containing a sample on a top surface. On a front side (left side in FIG. 1) which is one side of the housing 2, a rack insertion opening 14, which is an opening for inserting the sample rack 12 from a front end side to be accommodated in the temperature control space 4, is provided.

A proximal end of the sample rack 12 is provided with a handle 12*a* for holding the sample rack 12. Packing is attached to a peripheral edge of a sample rack front end side surface (surface on a right side in the diagram) of the handle 12*a*, and when the sample rack 12 is inserted from the front end side into the temperature control space 4, the packing of the handle 12*a* abuts on an edge of the rack insertion opening 14 so that sealing property of the rack insertion opening 14 is maintained.

Further, the sample rack 12 is disposed in the temperature control space 4 with a gap between the sample rack 12 and a floor surface of the temperature control space 4. A air guide plate 12*b* is provided in a front end portion of the sample rack 12. The air guide plate 12*b* abuts on a hood 24 to guide air cooled by the air temperature control part 16 to the gap between a lower surface of the sample rack 12 and the bottom surface of the temperature control space 4. On a proximal end side of the sample rack 12, an opening 12*c*, for letting air flowing in the gap between the sample rack 12 and the floor surface of the temperature control space 4 flow upward, is provided.

Figure 2:
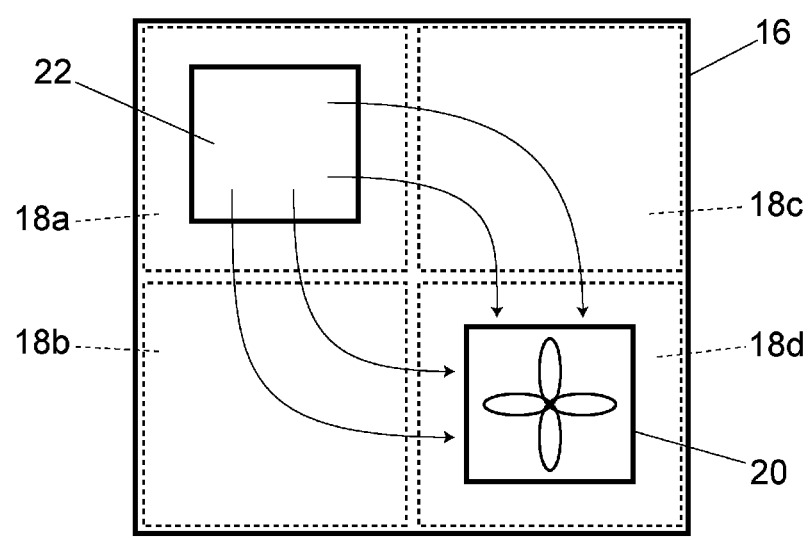
FIG. 2 is a front view showing a configuration of an air temperature control part of the embodiment.

The air temperature control part 16 is provided on a back surface side of the housing 2. As shown in FIG. 2, the air temperature control part 16 includes four Peltier elements 18*a* to 18*d* arranged in a matrix on a back surface of the housing 2, air intake portion 22 which is an opening for sucking air in the temperature control space 4, and a fan 20 for blowing air heated or cooled by the temperature control elements 18*a* to 18*d* toward the sample rack 12. The air intake portion 22 is provided on a front side of the Peltier element 18*a*, and the fan 20 is provided on a front surface side of the Peltier element 18*d*. Note that, in FIG. 1, in order to show the air intake portion 22 and the fan 20, the Peltier element 18*a* (first temperature control element) and the Peltier element 18*d* (second temperature control element) disposed diagonally among the four Peltier elements 18*a* to 18*d* are arranged vertically side by side. The air temperature control part 16 sucks air in the temperature control space 4 from the air intake portion 22, heats or cools the air with the Peltier elements 18a to 18d, and supplies the air into the temperature control space 4.

Referring back to FIG. 1, the air temperature control part 16 further includes the hood 24 for guiding air blown by the fan 20 to the gap between the lower surface of the sample rack 12 and the bottom surface of the temperature control space 4 together with the air guide plate 12b.

Each of the Peltier elements 18a to 18d (see FIG. 2) has one heat transfer surface disposed inside the temperature control space 4 and the other heat transfer surface disposed outside of the temperature control space 4, and a radiator including a plurality of fins is attached to each heat transfer surface. Note that, in FIG. 1, only radiators 28a, 28d, 30a, and 30d attached to heat transfer surfaces of the Peltier elements 18a, 18d are shown. The fan 20 is provided to blow air toward a front side of the housing 2 in a lower portion in the temperature control space 4. The air intake portion 22 is provided in an upper portion in the temperature control space 4.

The Peltier elements 18a to 18d of the air temperature control part 16 are driven independently of each other, so that the air temperature control part 16 can perform cooling temperature control operation in the temperature control space 4, heating operation with dehumidification (dehumidifying heating operation), and heating temperature control operation.

A temperature control part 34 controls operation of the air temperature control part 16. The temperature control part 34 can be obtained as a dedicated or general-purpose computer including an arithmetic element, such as a microcomputer, and a program executed by the arithmetic element. The temperature control part 34 receives an output signal from a temperature sensor 32 that detects a temperature in the temperature control space 4.

The temperature control part 34 is configured to cause the air temperature control part 16 to perform cooling temperature control operation when a temperature control mode is cooling temperature control. Specifically, some or all of Peltier elements 18a to 18d are driven as a cooling element, so that a temperature in the temperature control space 4 detected by temperature sensor 32 becomes a preset target temperature (<room temperature). In this cooling temperature control operation, any cooling element of the Peltier elements 18a to 18d may be used. However, by driving all of the Peltier elements 18a to 18d as cooling elements at least at the start of the cooling temperature control, a temperature in the temperature control space 4 can be reduced efficiently.

Further, the temperature control part 34 causes the air temperature control part 16 to perform heating temperature control operation when the temperature control mode is heating temperature control. In particular, in a case where the temperature control mode is switched from the cooling temperature control to the heating temperature control, the temperature control part 34 is configured to cause the air temperature control part 16 to perform the dehumidifying heating operation before the heating temperature control operation.

In the dehumidifying heating operation, at least the Peltier element 18a is driven as a cooling element, and at least the Peltier element 18d is driven as a heating element. In the configuration of the air temperature control part 16 of this embodiment, air taken in from the air intake portion 22 always passes through the radiator 30a attached to the Peltier element 18a first, and the radiator 30d attached to the Peltier element 18d last. Therefore, by driving the Peltier element 18a as a cooling element and driving the Peltier element 18d as a heating element, it is possible to simultaneously perform dehumidification and heating of the air taken in from the air intake portion 22.

Note that, in this dehumidifying heating operation, each of the Peltier elements 18b and 18c may be driven as either a cooling element or a heating element. For example, the Peltier element 18b provided immediately below the Peltier element 18a driven as a cooling element can also be driven as a cooling element, and the Peltier element 18c provided immediately above the Peltier element 18d driven as a heating element can also be driven as a heating element. In this way, the cooling element does not come directly above the heating element during the dehumidifying heating operation, dew condensation water generated in the radiator attached to the cooling element does not drip to the heating element side, and moisture in the air removed by the cooling element can be prevented from being evaporated again by the heating element and causing dew condensation.

The temperature control part 34 is configured to cause the air temperature control part 16 to perform the dehumidifying heating operation at least until a temperature in the temperature control space 4 reaches a preset threshold temperature (for example, room temperature) after switching is made to the heating temperature control. The threshold temperature is a temperature preset based on, for example, room temperature, as a temperature higher than a dew point temperature of the air in the temperature control space 4. The temperature control part 34 causes the air temperature control part 16 to perform the heating temperature control operation after the temperature in the temperature control space 4 reaches the threshold temperature.

In the heating temperature control operation, driving as a cooling element of the Peltier element, such as the Peltier element 18a which has been operated as a cooling element, is stopped and at least one of the Peltier elements 18a to 18d is driven as a heating element, so that the temperature in the temperature control space 4 detected by the temperature sensor 32 becomes a preset target temperature. At this time, only the Peltier element 18d needs to be used as a heating element.

Figure 3:
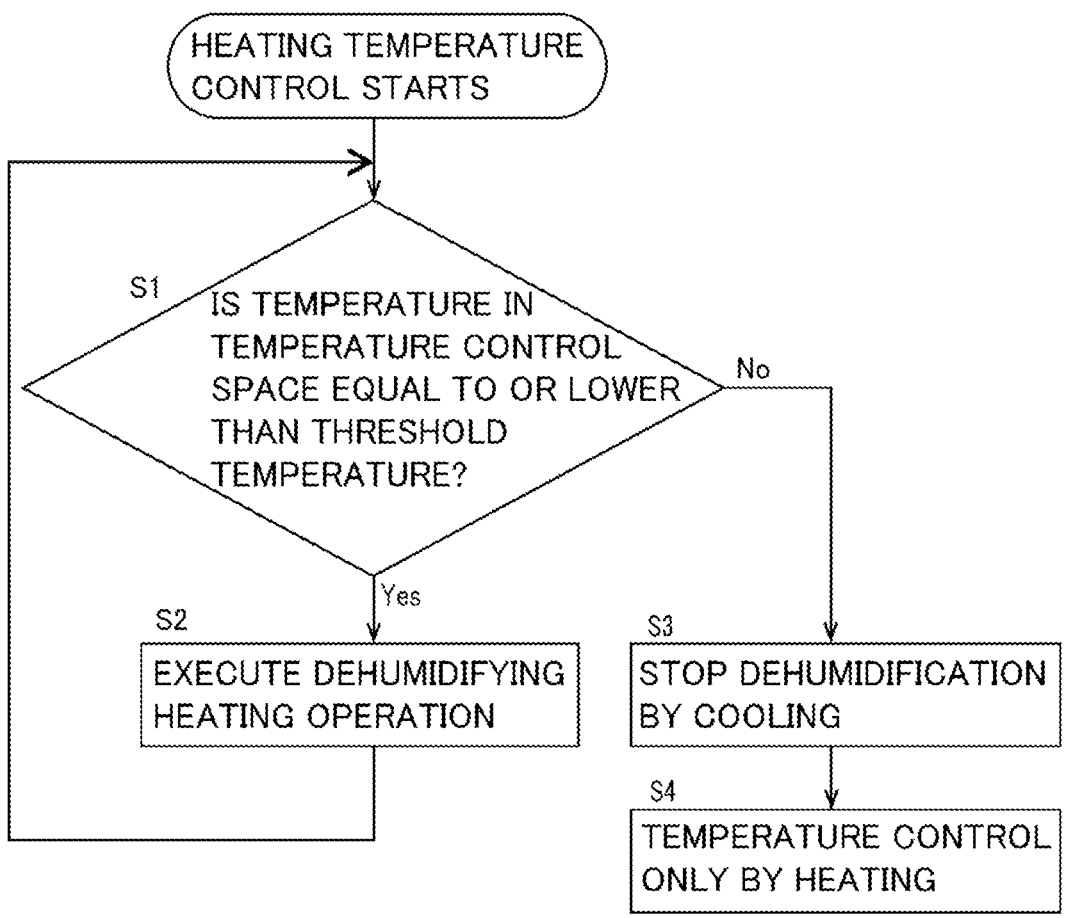
FIG. 3 is a flowchart showing an example of control of the air temperature control part at the time of heating temperature control in the embodiment.
Figure 4:
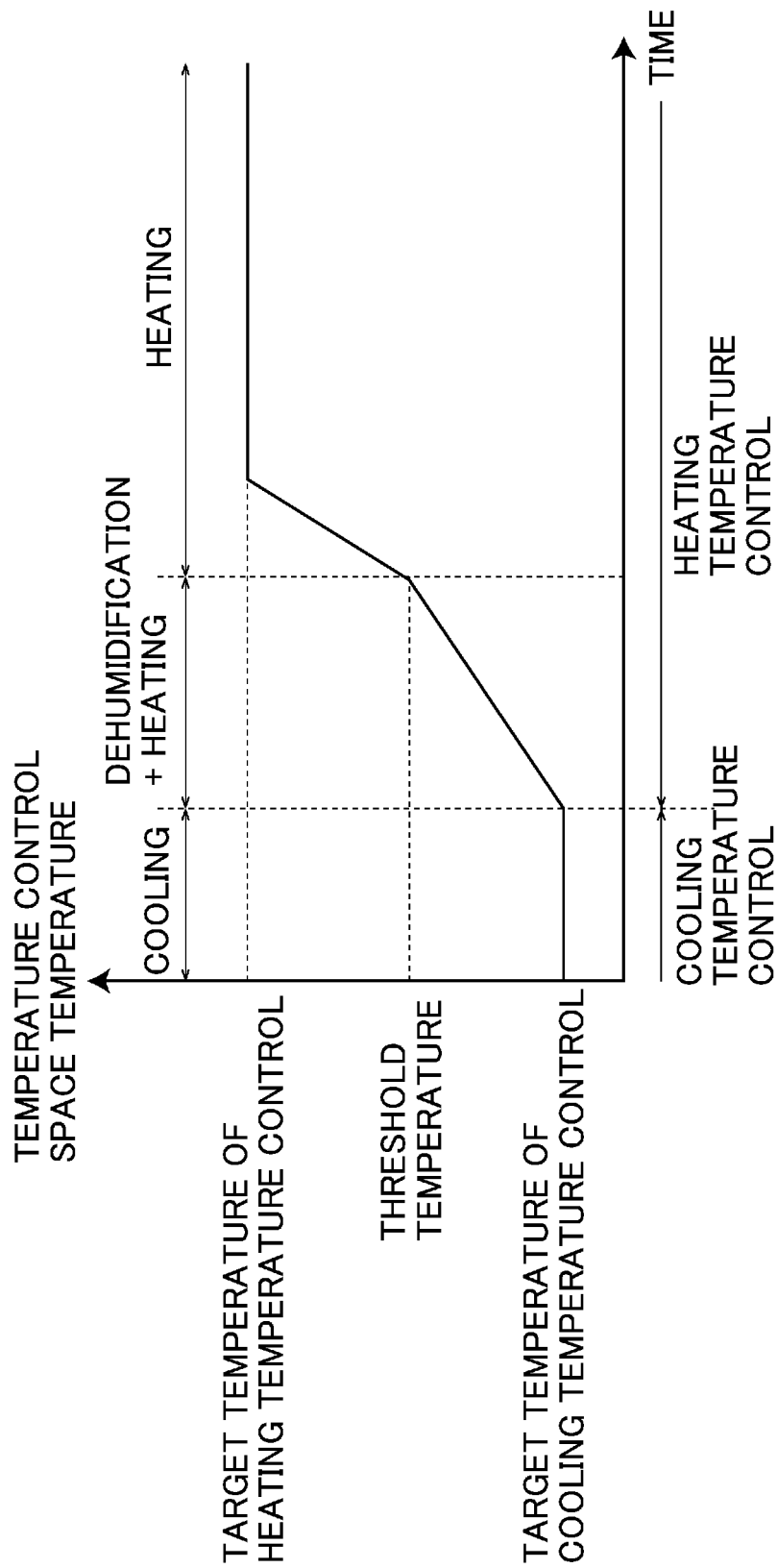
FIG. 4 is a graph showing an example of a time change in a temperature in temperature control space at the time of heating temperature control in the embodiment.

A function of the temperature control part 34 obtained when the temperature control mode is switched from the cooling temperature control to the heating temperature control will be described with reference to FIG. 1, a flowchart of FIG. 3, and a graph of FIG. 4.

The temperature control part 34 reads a temperature in the temperature control space 4 detected by the temperature sensor 32 at constant time intervals. When the temperature control mode is switched to the heating temperature control, the temperature control part 34 compares the temperature in the temperature control space 4 with the threshold temperature (Step S1), and when the temperature in the temperature control space 4 is equal to or lower than the threshold temperature in the temperature control space 4, the temperature control part 34 causes the air temperature control part 16 to execute the dehumidifying heating operation (Step S2). In this manner, the air in the temperature control space 4 is heated while being dehumidified.

When the temperature in the temperature control space 4 reaches the threshold temperature (Step S1), the temperature control part 34 stops the driving of the Peltier element which has been driven as a cooling element, and finishes the dehumidifying heating operation performed by the air temperature control part 16 (Step S3). After the above, the temperature control part 34 controls the operation of the Peltier element driven as the heating element to start temperature control only by heating so that the temperature in the temperature control space 4 approaches the target temperature (Step S4).

Note that, in the embodiment described above, when the temperature control mode is switched from the cooling temperature control to the heating temperature control, the dehumidifying heating operation is performed halfway, and thereafter, the heating temperature control operation is performed. However, the present invention is not limited to this, and the heating temperature control may be performed only in the dehumidifying heating operation.

Further, the apparatus 1 of the embodiment described above is obtained by, for example, a liquid chromatograph autosampler. When the apparatus 1 is an autosampler, a needle or a syringe pump for sucking a sample held by the sample plate 10, a drive mechanism for moving the needle, and the like are also provided in the temperature control space 4.

What is claimed is:

1. An autosampler for a liquid chromatograph, comprising:
   a temperature control space for containing a sample and controlling a temperature of the sample;
   an air temperature control part having an air intake portion for sucking air in the temperature control space,
   a fan for blowing air taken in from the air intake portion toward the sample contained in the temperature control space,
   a first temperature control element provided for performing at least cooling of air taken in from the air intake portion on a path of the air, and
   a second temperature control element that is driven independently of the first temperature control element and provided to perform at least heating of air taken in from the air intake portion downstream of the first temperature control element on a path of the air;
   a temperature sensor configured to detect a temperature in the temperature control space; and
   a temperature control part configured to
   control operation of the first temperature control element to lower the temperature in the temperature control space in response to a temperature control mode being set to a cooling mode,
   control operation of the second temperature control element to increase the temperature in the temperature control space in response to the temperature control mode being set to a heating mode,
   in response to the temperature control mode being switched from the cooling mode to the heating mode, execute a dehumidifying heating operation for cooling and dehumidifying air taken in from the air intake portion with the first temperature control element and heating air dehumidified by the first temperature control element with the second temperature control element, and
   execute, in a process of raising a temperature in the temperature control space lower than room temperature, the dehumidifying heating operation until a temperature in the temperature control space detected by the temperature sensor reaches a threshold temperature that is a temperature equal to or higher than a dew point temperature, and stop cooling by the first temperature control element after the temperature in the temperature control space reaches the threshold temperature.

2. The autosampler according to claim 1, wherein
the second temperature control element can also cool air, and
the temperature control part is configured to cool air taken in from the air intake portion with the first and second temperature control elements when performing cooling temperature control to lower a temperature in the temperature control space to a predetermined temperature lower than room temperature.

3. The autosampler according to claim 1, wherein
the first temperature control element can also heat air, and
the temperature control part is configured to perform heating with the first and second temperature control elements when performing heating temperature control to raise a temperature in the temperature control space to a temperature higher than room temperature.

* * * * *